UNITED STATES PATENT OFFICE.

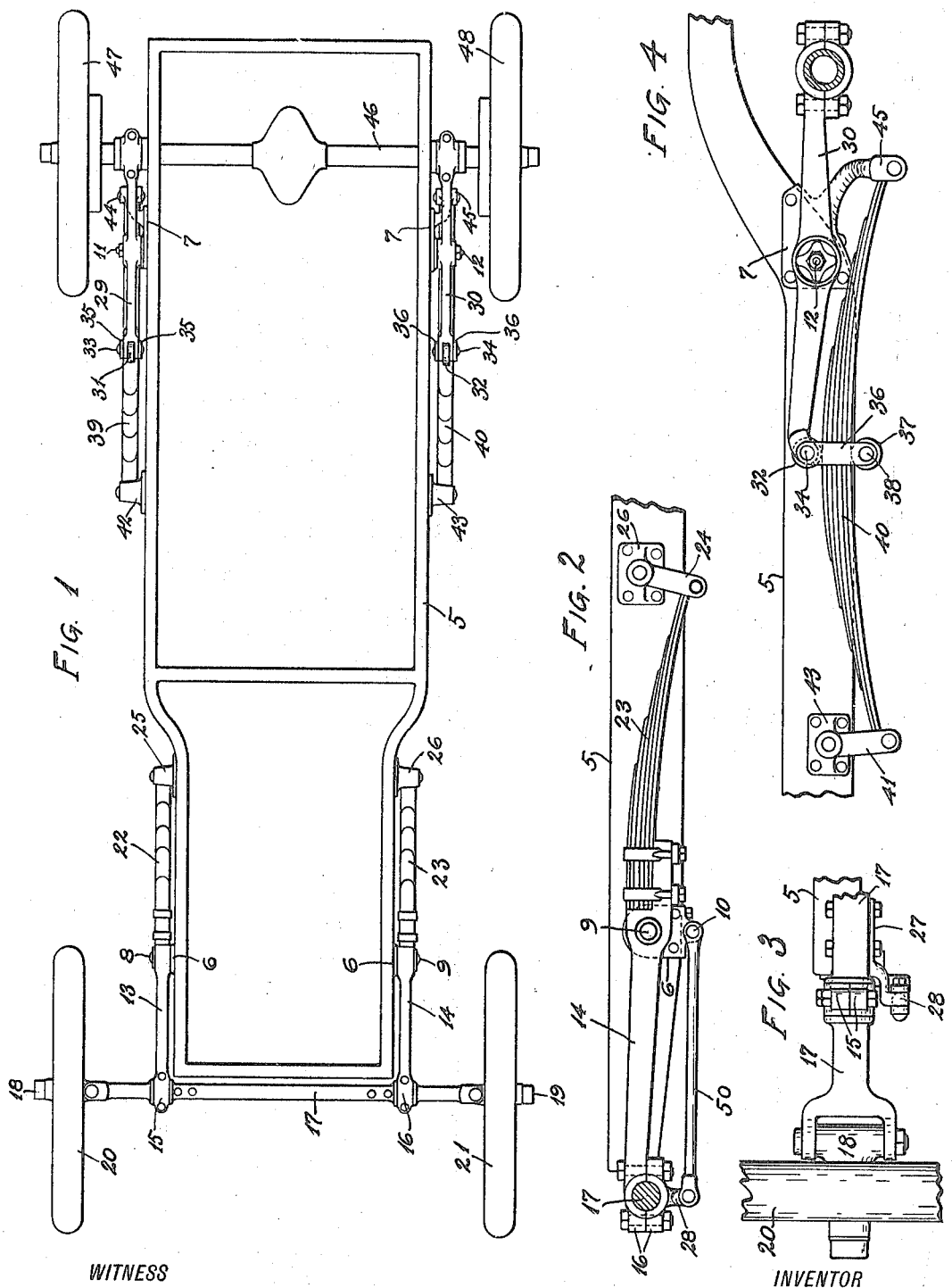

ROBERT E. OLSEN, OF SEATTLE, WASHINGTON.

VEHICLE.

1,206,360. Specification of Letters Patent. Patented Nov. 28, 1916.

Application filed March 4, 1916. Serial No. 82,259.

*To all whom it may concern:*

Be it known that I, ROBERT E. OLSEN, a citizen of the United States, residing at Seattle, in the county of King and State of Washington, have invented a certain new and useful Improvement in Vehicles, of which the following is a specification.

My invention relates to improvements in vehicles, as automobiles, carriages and the like, and the object of my invention is to provide a vehicle which shall embody particular devices interposed between its body-supporting frame or chassis and its running gear to secure said frame or chassis in such association with said running gear that it may be yieldingly supported thereby, and which devices shall better serve to lessen the violence of shocks due to abrupt vertical movements of the wheels of said vehicle than would other devices heretofore made.

I accomplish such object by devices illustrated in the accompanying drawings wherein—

Figure 1 is a plan view of the running gear and the chassis of an automobile with which my invention is associated; Fig. 2 is an enlarged view in side elevation of forward parts of the same; Fig. 3 is a fragmentary view in front elevation of said forward parts; and Fig. 4 is a fragmentary view in side elevation of rearward parts of the same.

Referring to the drawings, throughout which like reference numerals designate like parts, 5 is the chassis of an automobile, to the opposite sides of the forward and the rearward portions of which chassis 5 are bolted brackets 6 and brackets 7. Each of the brackets 6 is provided with an integral stud, as studs 8 and 9, and also with a lower disposed stud, as the stud 10 shown only in Fig. 2, while the brackets 7 are each provided with only one stud, as studs 11 and 12, all of which studs project in a sidewise direction from the outer side of the chassis 5.

Mounted on each of the studs 8 and 9 to be fulcrumed thereby is a different one of two similar levers, as levers 13 and 14 respectively, which extends forwardly and rearwardly from its fulcrumed point in a normally horizontal plane.

The forward end portion of each of the levers 13 and 14 is provided with journal-bearings, as journal-bearings 15 and 16, within which are disposed journaled portions of an axle 17, to which axle 17 are swiveled the spindles 18 and 19 upon which are rotatably mounted the front wheels 20 and 21 of the automobile.

To the rearward end portion of each of the levers 13 and 14 is clamped the forward end portion of a compound spring, as springs 22 and 23, of well known form, comprising a plurality of thin bars of springy steel which vary in their lengths, the two longest and bottom ones of which extend rearwardly to a point where they are articulated to the lower end of a link, as link 24, whose upper end is articulated to a bracket, as brackets 25 and 26, to be freely suspended thereon as more clearly shown in Fig. 2, said brackets being bolted to the outer sides of the chassis 5.

Bolted to the underside of the axle 17, between the journal-bearings 15 and 16 and adjacent to each of them, is a bracket, as bracket 27, that is provided with an arm 28 to which is articulated the forward end of a connecting rod 50 whose rearward end is articulated with the stud 10 of the bracket 6, as more clearly shown in Fig. 2, whereby the axle 17 is prevented from moving rotatively in the journal-bearings 15 and 16 except in response to a flexion of the springs 22 and 23 due to vertical bouncing movements of the chassis 5, and whereby the swivel joint between the spindles 18 and 19 and the axle 17 will be maintained constantly in the same vertical position irrespective of oscillations of the levers 13 and 14.

The studs 11 and 12, which project from the brackets 7 at the rearward end portion of the chassis 5, serve respectively as fulcrums for levers 29 and 30 that are mounted thereon.

The forward end portion of each of the levers 29 and 30 is bifurcated, and between the members of such bifurcated portion is disposed a roller (as rollers 31 and 32) which is rotatably mounted on a pivot pin (as pins 33 and 34) which pivot pin extends through said members of said bifurcated portion to project from each side thereof and to such projecting portions of said pivot pin are articulated the upper ends two links (as links 35 and 36) between whose lower ends is disposed a roller, as roller 37, which is rotatably mounted on a pin, like the pin 38, and disposed between said rollers, in engagement therewith, on each side of the chassis 5, is a leaf-spring (as leaf-springs 39 and 40) of well known form, which extend in a direction parallel with the sides of said chassis 5.

The forward end of each of said leaf-springs 39 and 40 is attached to a link 41 which is suspended by a bracket (as brackets 42 and 43) that is bolted to the adjacent side of the chassis 5, while its rearward end is articulated to an arm (as arms 44 and 45) that is integral with the bracket 7.

The rearward end portion of each of the levers 29 and 30 is rigidly clamped to the tubular axle 46 of the rearward truck upon which axle 46 are mounted the rearward wheels 47 and 48 of the automobile, which wheels are adapted in a well known manner to be driven by a shaft within said axle 46.

By the devices thus illustrated and described, the chassis 5 will be little effected by violent vertical movements due to its travel over rough roads by reason of the peculiar arrangement and conjoint action of the levers 13, 14, 29, and 30 and their associated springs 22, 23, 39 and 40, respectively, whereby an upward movement of either or both of the axles 17 and 46 will tend to depress said chassis 5 as much as such movement will tend to raise it.

Obviously changes may be made in the forms, dimensions and arrangement of parts of my invention without departing from the spirit thereof.

What I claim is:

1. The combination with the chassis and axle of a vehicle, of four brackets fastened two on each of different sides of the rearward end portion of said chassis; a link suspended from each of the forwardly disposed ones of said brackets; two supporting-springs disposed one to extend rearwardly between and to connect with the lower end of a different one of said links and a different one of the rearwardly disposed ones of said brackets; two levers pivotally mounted one on each side of said rearward end portion of said chassis to extend in a line parallel therewith; a roller rotatably mounted on the forwardly projecting end portion of each of said two levers and disposed to engage with and to rest upon the central portion of the top surface of the adjacent supporting-spring; clamping means associated with the rearward end portions of said two levers and disposed rigidly to clamp said end portions to the rearward one of said axles; two other levers pivotally mounted one on each side of the forward end portion of said chassis to extend in a line parallel therewith; bearings associated with the forwardly projected end portion of each of said two other levers, within which bearings are disposed the forward one of each of said axles to be rotatively movable therein; two pivot studs disposed in fixed relation to the underside of said forward one of said axles; two studs disposed one on each side of the forward end portion of said chassis in fixed relation thereto; connecting rods disposed each to extend between and to connect with a different one of said pivot studs and a corresponding one of said fixed studs; supporting-springs, each having one end portion fastened to the rearward end portion of a different one of said two other levers; and a link suspended from each side of the forward end portion of said chassis at a point adjacent to the rearward end of the respective one of said supporting-springs, to the lower end of which link is articulated the end of the adjacent one of said supporting-springs.

2. A vehicle which embodies a chassis; a front axle; a rear axle; four brackets, two of which are fastened on each of different sides of the rearward end portion of said chassis; a link suspended from each of the forwardly disposed ones of said brackets; supporting-springs disposed one to extend between and to connect with the lower end of a different one of said links and a different one of the rearwardly disposed ones of said brackets; two levers pivotally mounted one on each side of said rearward end portion of said chassis to extend in a line parallel therewith; a roller rotatably mounted on the forwardly projecting end portion of each of said two levers and disposed to engage with and to rest upon the central portion of the top surface of the adjacent supporting-spring; and clamping means associated with the rearward end portions of said two levers and disposed rigidly to clamp the end portions of said two levers to said rear axle.

3. A vehicle which embodies a chassis; a front axle; a rear axle; two levers pivotally mounted one on each side of the forward end portion of said chassis to extend in a line parallel therewith; bearings associated with the forwardly projecting end portion of each of said two levers, within which bearings are disposed said front axle to be rotatively movable therein; two pivot studs disposed in fixed relation to the underside of said front axle; two studs disposed one on each side of the forward end portion of said chassis in fixed relations thereto; connecting rods disposed each to extend between and to connect with a different one of said pivot studs and a corresponding one of said fixed studs; supporting-springs, each having one end portion fastened to the rearward end portion of a different one of said two levers; and a link suspended from each side of the forward end portion of said chassis at a point adjacent to the rearward end of the respective one of said supporting-springs, to the lower end of which link is articulated the end of the adjacent one of said supporting-springs.

In witness whereof I hereunto subscribe my name this 29th day of January, A. D. 1916.

ROBERT E. OLSEN.

Witnesses:
FRED PATTEN,
ROY THORSTAD.